(12) United States Patent
Aguilar et al.

(10) Patent No.: US 12,213,058 B2
(45) Date of Patent: Jan. 28, 2025

(54) METHOD AND APPARATUS FOR PROBING ACCESS POINTS

(71) Applicant: MARS, INCORPORATED, McLean, VA (US)

(72) Inventors: Ernie Aguilar, San Francisco, CA (US); Robert W. Mott, San Francisco, CA (US); Xin Yang, San Francisco, CA (US)

(73) Assignee: MARS, INCORPORATED, McLean, VA (US)

( * ) Notice: Subject to any disclaimer, the term of this patent is extended or adjusted under 35 U.S.C. 154(b) by 399 days.

(21) Appl. No.: 17/773,566

(22) PCT Filed: Oct. 30, 2020

(86) PCT No.: PCT/US2020/058384
§ 371 (c)(1),
(2) Date: Apr. 29, 2022

(87) PCT Pub. No.: WO2021/087376
PCT Pub. Date: May 6, 2021

(65) Prior Publication Data
US 2022/0369213 A1    Nov. 17, 2022

Related U.S. Application Data

(60) Provisional application No. 62/929,626, filed on Nov. 1, 2019.

(51) Int. Cl.
*H04W 48/16*    (2009.01)
*H04W 4/021*    (2018.01)
(Continued)

(52) U.S. Cl.
CPC .......... *H04W 48/16* (2013.01); *H04W 4/021* (2013.01); *H04W 48/20* (2013.01); *H04W 72/0453* (2013.01)

(58) Field of Classification Search
None
See application file for complete search history.

(56) References Cited

U.S. PATENT DOCUMENTS

2006/0200862 A1*    9/2006    Olson ................. H04L 63/1433
                                                        726/23
2014/0050210 A1    2/2014    Waters et al.
(Continued)

FOREIGN PATENT DOCUMENTS

EP    3 104 631 A1    12/2016
JP    2014-522599 A    9/2014

OTHER PUBLICATIONS

International Search Report mailed Feb. 12, 2021 in International Application No. PCT/US2020/058384.

*Primary Examiner* — Alex Skripnikov
(74) *Attorney, Agent, or Firm* — Baker Botts L.L.P.

(57) ABSTRACT

A system, method, and apparatus for improving communication between mobile or wearable devices and access points of the wireless land area network. The method includes sensing at a client station a service set identifier for a wireless access network. The method also includes determining a subset of channels within the wireless access network by accessing information stored in a database, and determining a scan time interval associated with the service set identifier by accessing the information stored in the database. In addition, the method includes transmitting a probe request through the subset of channels to an access point located within the wireless access network and receiving a probe response at the client station from the access point during the scan time interval. Further, the method includes identifying location of the client station based on the probe response.

17 Claims, 13 Drawing Sheets

(51) Int. Cl.
   *H04W 48/20*   (2009.01)
   *H04W 72/0453*   (2023.01)

(56) References Cited

U.S. PATENT DOCUMENTS

| | | |
|---|---|---|
| 2015/0051993 A1 | 2/2015 | Moshfeghi |
| 2018/0103342 A1* | 4/2018 | Taylor .................. H04W 4/025 |
| 2018/0128623 A1* | 5/2018 | Surnilla .................. G01C 21/34 |
| 2019/0200161 A9 | 6/2019 | Waters et al. |
| 2020/0045772 A1* | 2/2020 | Rom .................. H04W 28/0236 |

* cited by examiner

METHOD AND APPARATUS FOR PROBING ACCESS POINTS

CROSS-REFERENCE TO RELATED APPLICATIONS

This application is a U.S. National Stage Patent Application under 35 U.S.C. § 371 of International Patent Application No. PCT/US2020/058384, filed on Oct. 30, 2020, which claims priority to U.S. provisional patent application No. 62/929,626, filed on Nov. 1, 2019, the contents of each of which is are incorporated herein by reference in its entirety in their entireties, and to each of which priority is claimed.

TECHNICAL FIELD

The embodiments described in the disclosure relate to a wireless local area network, more particularly to scanning and probing access points located within the wireless local area network.

BACKGROUND

Mobile devices and/or wearable devices have been fitted with various hardware and software components that can help connect the devices to a wireless land area network (WLAN). WLAN is a wireless computer network that interconnects computers or devices within a given geographic area. A given mobile or wearable device that connected to the WLAN is referred to as a station (STA). To connect to the WLAN, a STA communicates with an access point (AP), such as a wireless router, which serves as a base station for the WLAN. Each WLAN is identified using a service set identifier (SSID), while the AP is identified using a media access control (MAC) address referred to as a basic service set identifier (BSSID).

The ever-growing reliance on WLAN communications has resulted in an increased need to improve how mobile and wearable devices interact with APs. Accordingly, there is an ongoing demand for a mobile or wearable device that communicates with the AP in an efficient and reliable manner, while reducing the amount of network and mobile resources dedicated to such an interaction.

BRIEF SUMMARY

To remedy the aforementioned deficiencies, the disclosure presents systems, methods, and apparatus which can improve communications between mobile or wearable devices and AP of the WLAN.

In certain non-limiting embodiments, the disclosure describes a method. The method can include sensing or detecting at a client station a service set identifier for a wireless access network. The wireless access network can operate on a 2.4 gigahertz radio frequency band. The method can also include determining a subset of channels within the wireless access network by accessing information stored in a database, and determining a scan time interval associated with the service set identifier by accessing the information stored in the database. The determining of the subset of channels and/or the determining of the scan time interval can help to reduce at least one of battery usage at the client station or execution time for the identifying of the location of the client station.

In addition, the method can include transmitting a probe request through the subset of channels to an access point located within the wireless access network, and receiving a probe response at the client station from the access point during the scan time interval. The method can further include identifying location of the client station based on the probe response.

In certain non-limiting embodiments, the method can include confirming that the client station is located in a pre-determined geo-fence zone based on the identified location. In other non-limiting embodiments, the method can include confirming that the client station is located outside a pre-determined geo-fence zone based on the identified location, and transmitting an indication to the user equipment that the client station has exited the pre-determined geo-fence zone.

In some non-limiting embodiments, the method can include performing at the client station a plurality of multi-channel scans of the wireless access network. The method can also include storing the probe response received at the client station in the database. The probe response can include at least one of signal strength information, success rate, or an identification of the channels from which the probe response was received. In addition, the method can include performing a binary search to determine the scan time interval based on at least one of the signal strength information or probe response success rate. The binary search can be performed when the client station is charging. The identification of the channels from which the probe response is received can be stored in a first in, first out buffer included in the database.

In other non-limiting embodiments, the method can include transmitting an inquiry from the client station to the database requesting the subset of channels, wherein the subset of channels is based on the identification of channels stored in the buffer of the database. The transmitting of the inquiry can occur when the client station is operating on battery power. In addition, the subset of channels can be determined based on at least one of a latest or most occurring of the channels stored in the buffer.

In certain non-limiting embodiments, a client station can include at least one non-volatile storage medium comprising computer program code, and at least one processor. The computer program code can be configured, when executed by the at least one processor, to cause the client station to sense or detect a service set identifier for a wireless access network. The computer program code can also be configured, when executed by the at least one processor, to cause the client station to determine a subset of channels within the wireless access network by accessing information stored in a database, and determine a scan time interval associated with the service set identifier by accessing the information stored in the database. In addition, the computer program code can be configured, when executed by the at least one processor, to cause the client station to transmit a probe request through the subset of channels to an access point located within the wireless access network, and receive a probe response from the access point during the scan time interval. Further, the computer program code can also be configured, when executed by the at least one processor, to cause the client station to identify location of the client station based on the probe response.

In some non-limiting embodiments, the method performed by an access point can include receiving at the access point located within a wireless access network a probe request from a client station through a subset of channels. The method can also include transmitting a probe response from the access point to the client station during a scan time interval. The probe response can be used to confirm that the client station is inside or outside a geo-fence zone.

In certain non-limiting embodiments, a client station can include at least one non-volatile storage medium comprising computer program code, and at least one processor. The computer program code can be configured, when executed by the at least one processor, to cause the client station to receive at the access point located within a wireless access network a probe request from a client station through a subset of channels. The computer program code can also be configured, when executed by the at least one processor, to cause the client station to transmit a probe response from the access point to the client station during a scan time interval. The probe response can be used to confirm that the client station is inside or outside a geo-fence zone.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
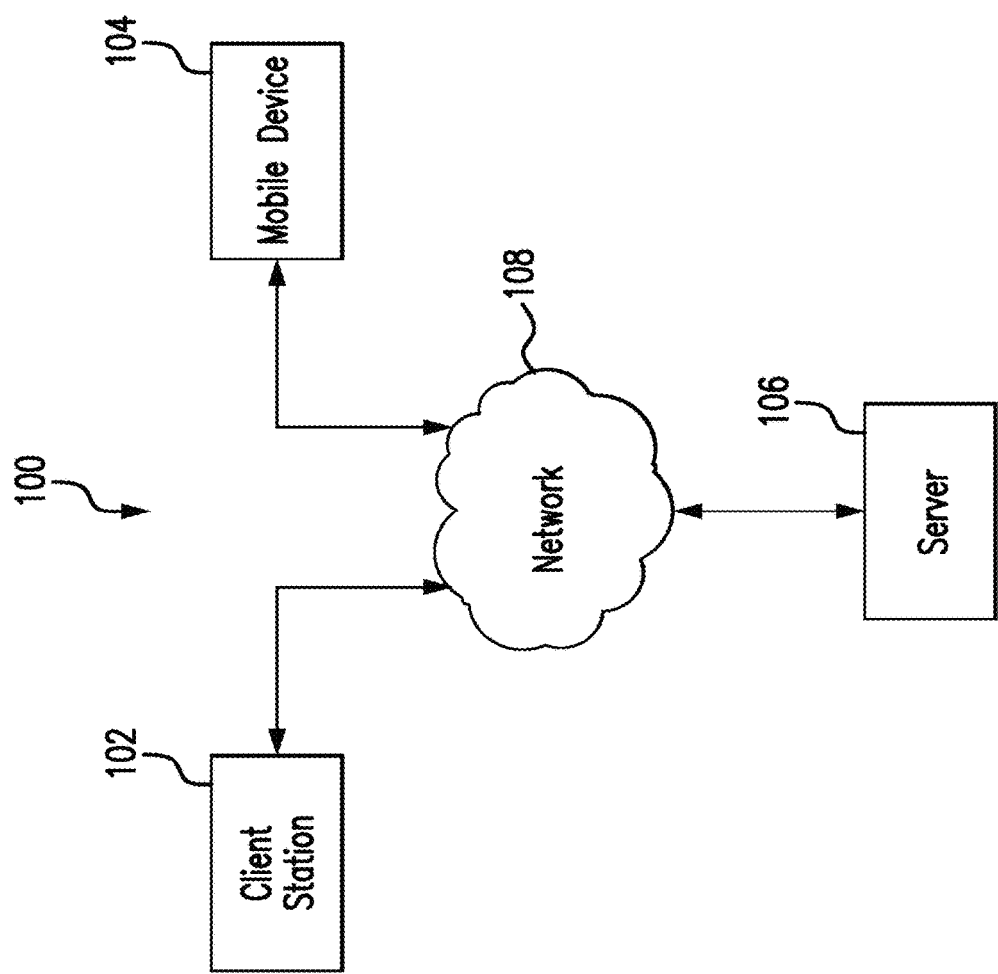
FIG. 1 illustrates a system according to certain non-limiting embodiments.

There remains a need for a system, apparatus, and method which can improve communications between mobile or wearable devices and an AP of a WLAN. In certain embodiments the mobile or wearable device can be referred to as a client station, user equipment, or STA. The presently disclosed subject matter addresses the above need, as well as others needs associated with WLAN and/or client stations. Specifically, the client station can leverage information stored in a database to determine a probe response scan interval and/or a subset channels through which to communicate with the AP. Based on the determined scan interval and subset channels the client station can reduce the amount of battery resources used to transmit and receive probe requests and responses, respectively. The determined scan interval and subset channels can also help to reduce the amount of time used to identify the location of a given client station or confirm that the client station is inside or outside a geo-fence zone.

U.S. patent application Ser. No. 15/291,882, now U.S. Pat. No. 10,142,773 B2, and U.S. patent application Ser. No. 14/988,621 are hereby incorporated by reference. The entire subject matter disclosed in the above referenced applications, including the specification, claims, and figures are incorporated herein.

The present disclosure will now be described more fully hereinafter with reference to the accompanying drawings, which form a part hereof, and which show, by way of illustration, certain example embodiments. Subject matter can, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, apparatus, components, or systems. Accordingly, embodiments can, for example, take the form of hardware, software, firmware or any combination thereof (other than software per se). The following detailed description is, therefore, not intended to be taken in a limiting sense.

As used in the specification and the appended claims, the singular forms "a," "an" and "the" include plural references unless the context clearly dictates otherwise. Thus, for example, reference to "an access point" can include more than one access point.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

The term "client station" as used in accordance with the present disclosure can refer to a user equipment, STA, wearable device, wearable tracking device, mobile device, or any other user device used to communicate with an access point of a WLAN. For example, the client station can be a pet or animal wearable device, such as an animal or pet tracking device.

The term "access point" as used in accordance with the present disclosure refers to any device, server, router, gateway, or base station used by to connect the client station to the WLAN. In other words, a client station interfaces with the WLAN via the access point.

The terms "animal" or "pet" as used in accordance with the present disclosure refers to domestic animals including, but not limited to, domestic dogs, domestic cats, horses, cows, ferrets, rabbits, pigs, rats, mice, gerbils, hamsters, goats, and the like. Domestic dogs and cats are particular non-limiting examples of pets. The term "animal" or "pet" as used in accordance with the present disclosure can further refer to wild animals, including, but not limited to bison, elk, deer, venison, duck, fowl, and the like.

As used herein, the term "geo-fence zone" or "geo-fence location" can be a pre-determined, pre-selected, or known geographical area or location selected by the user. The geo-fence zone or location can be used to define a familiar geographical area or location to the pet or animal, such as the residence of the owner or care giver of the pet. In some examples the geo-fence zone or location can be determined using a global positioning system (GPS) or global navigation satellite system (GLONASS) receiver to determine the latitude and longitude of a device. In other examples, the geo-fence zone, location, or presence can be determined using pre-determined, preselected, or known SSID of a WLAN network. When the geo-fence zone or location is determined using an SSID scan, or any other characteristic or measurement associated with the WLAN, the geo-fence zone or location can be referred to as a "beacon zone." In other words, in certain non-limiting embodiments a client station can be determined to be in a given zone or location when it is within the transmission range of a given access point. To determine whether the client station is located within or outside a geo-fence location or zone, the client station can transmit probe requests and received probe responses from an AP of the WLAN network.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The term "based on" can be understood as not necessarily intended to convey an exclusive set of factors and can, instead, allow for existence of additional factors not necessarily expressly described, again, depending at least in part on context.

The term "processor" can be understood as any hardware or software used to execute computer program instructions. These computer program instructions can be provided to a processor of a general purpose computer to alter its function to a special purpose, a special purpose computer, application-specific integrated circuit (ASIC), or other programmable digital data processing apparatus, such that the instructions, which execute via the processor of the client station or other programmable data processing apparatus, implement the functions/acts specified in the block diagrams or operational block or blocks, thereby transforming their functionality in accordance with embodiments herein. In certain non-limiting embodiments, the processor can be a portable embedded micro-controller or micro-computer.

Figure 4A:
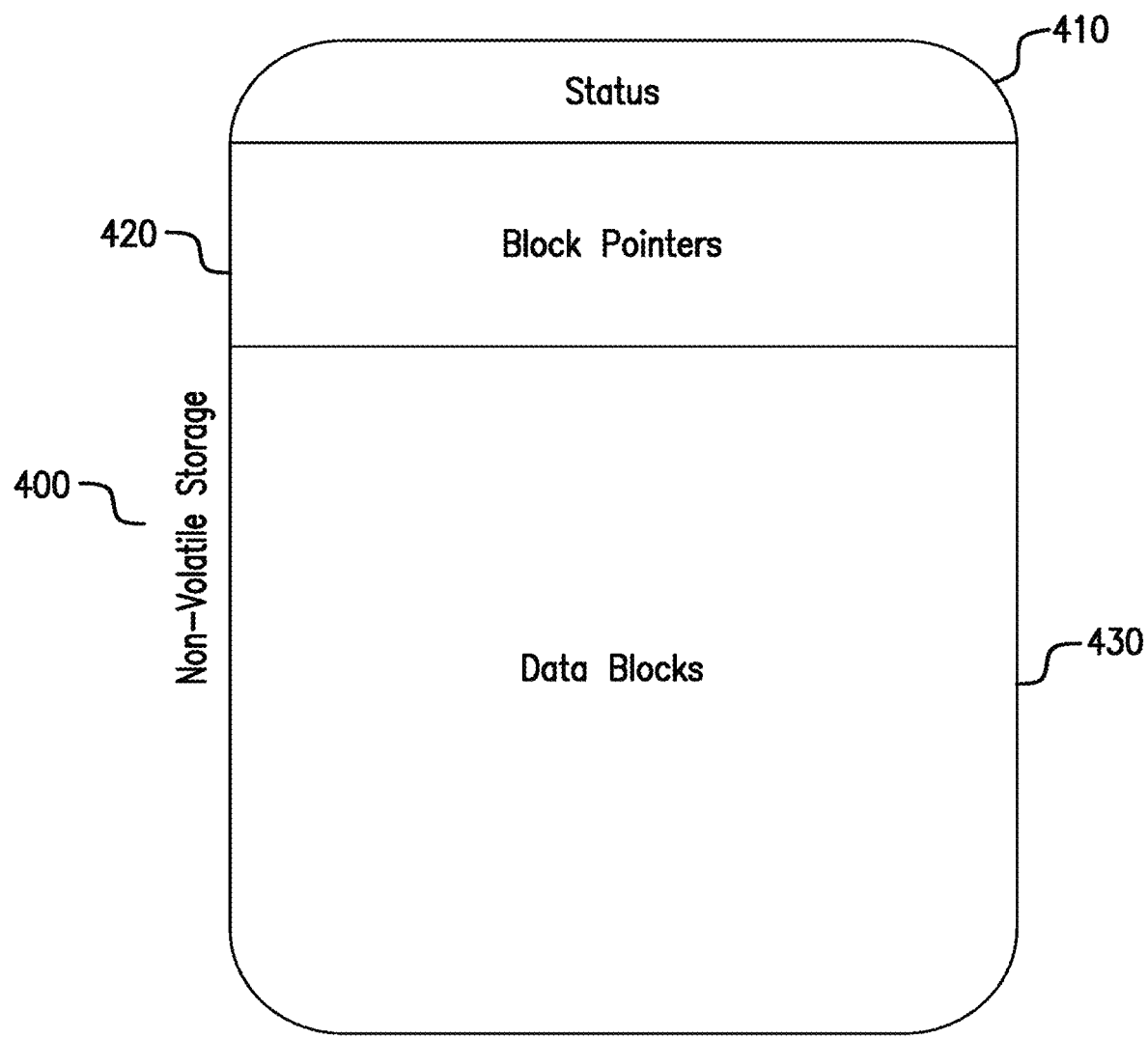
FIG. 4A illustrates a database according to certain non-limiting embodiments.
Figure 4B:
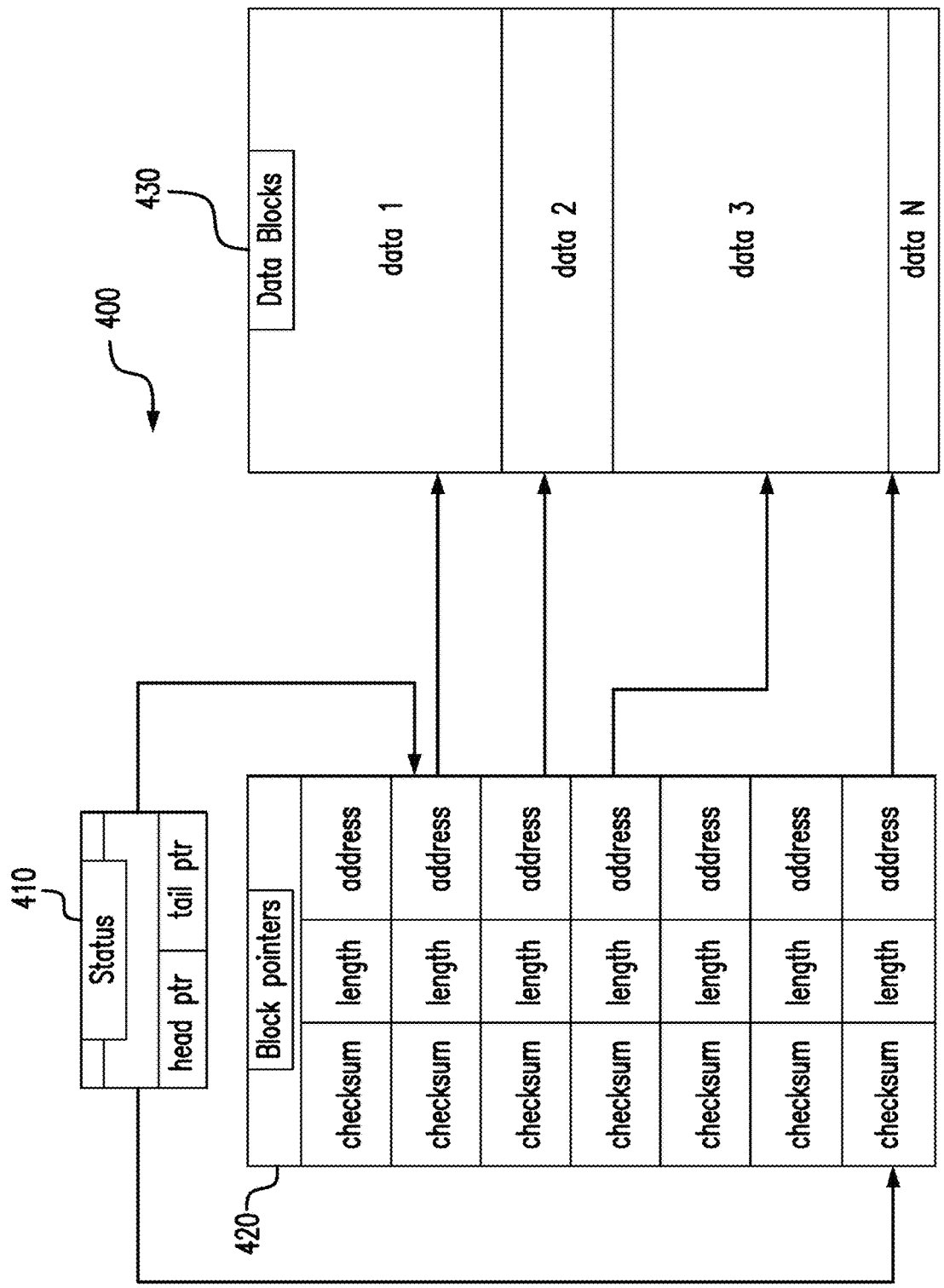
FIG. 4B illustrates a database according to certain non-limiting embodiments.

The terms "computer readable medium" "storage medium/media" or "memory" can be understood as any hardware or software that stores computer data. The data can include computer program code (or computer-executable instructions) that is executable by a computer, client station, or access point, in machine readable form. By way of example, and not limitation, a computer readable medium can include computer readable storage media, for tangible or fixed storage of data, or communication media for transient interpretation of code-containing signals. Computer readable storage media, as used herein, can refer to physical or tangible storage (as opposed to signals) and includes without limitation volatile and non-volatile, persistent, removable and non-removable media implemented in any method or technology for the tangible storage of information such as computer-readable instructions, data structures, program modules or other data. FIGS. 4A and 4B illustrate an example embodiments of a database included within a non-volatile storage 400.

Computer readable storage media or memory can include, but is not limited to, random access memory (RAM), read-only memory (ROM), erasable programmable read-only memory (EPROM), electrically erasable programmable read-only memory (EEPROM), flash memory or other solid-state memory technology. The computer readable storage media or memory can also include compact disc read-only optical memory (CD-ROM), digital versatile disc (DVD), any other optical storage, magnetic cassettes, magnetic tape, magnetic disk storage or other magnetic storage devices, or any other physical or material medium which can be used to tangibly store the desired information or data or instructions and which can be accessed by a computer or processor.

The term "server" as used in accordance with the present disclosure refers to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems.

A server can include, for example, dedicated rack-mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems.

The term "network" as used in accordance with the present disclosure refers to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more wireless local area networks (WLANs), one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

For purposes of this disclosure, a "wireless network" should be understood to couple client devices with a network. A wireless network can employ stand-alone ad-hoc networks, mesh networks, WLANs, cellular networks, or the like. A wireless network can further include a system of terminals, gateways, routers, or the like coupled by wireless radio links, or the like, which can move freely, randomly or organize themselves arbitrarily, such that network topology can change, at times even rapidly.

A wireless network can further employ a plurality of network access technologies, including WLAN, such as IEEE 802.11, Long Term Evolution (LTE), LTE-Advanced, Wireless Router (WR) mesh, or 2nd, 3rd, or 4th generation (2G, 3G, or 4G) cellular technology, or newer Internet of Things (IOT), fifth generation (5G), or new radio (NR) technology and the like. Network access technologies can enable wide area coverage for devices, such as client devices with varying degrees of mobility, for example.

For example, a network can enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, IEEE 802.11b/g/n, or any other 802.11 protocol. A wireless network can include virtually any type of wireless communication mechanism by which signals can be communicated between devices, such as a client device or a computing device, between or within a network, or the like.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

FIG. 1 illustrates a system according to certain non-limiting embodiments. In particular, as illustrated in FIG. 1, the system 100 can include a client station 102, such as a pet or animal wearable device, a mobile device 104 used by the owner or care giver of the pet or animal, a server 106, and/or a network 108, such as a WLAN. Client station 102 can be a wearable device placed on a collar of the pet or animal. Client station 102 can be used to track, monitor, and/or detect the activity or location of the pet. Mobile device 104 can include a web-based application that can communicate with client station 102.

When client station 102 is located in a geo-fence zone, the probe response received by client station 102 from the AP of the WLAN can be stored in a database. The database, for example, can be located in server 106. On the other hand, when client station 102 has exited a geo-fence zone, the client station 102 can turn on its GPS receiver and transmit the coordinates to server 106 using network 108, which can be a cellular network or a WLAN. Server 106 can then transmit an alert to mobile device 104, or the web-based application located on mobile device 104, informing the user that client station 102 has exited a geo-fence zone. The alert can be an interactive map, a text message, and/or an e-mail message. In other non-limiting embodiments, client station 102 can directly or indirectly initiate the transmittal and/or transmit the alert to mobile device 104.

Figure 2:
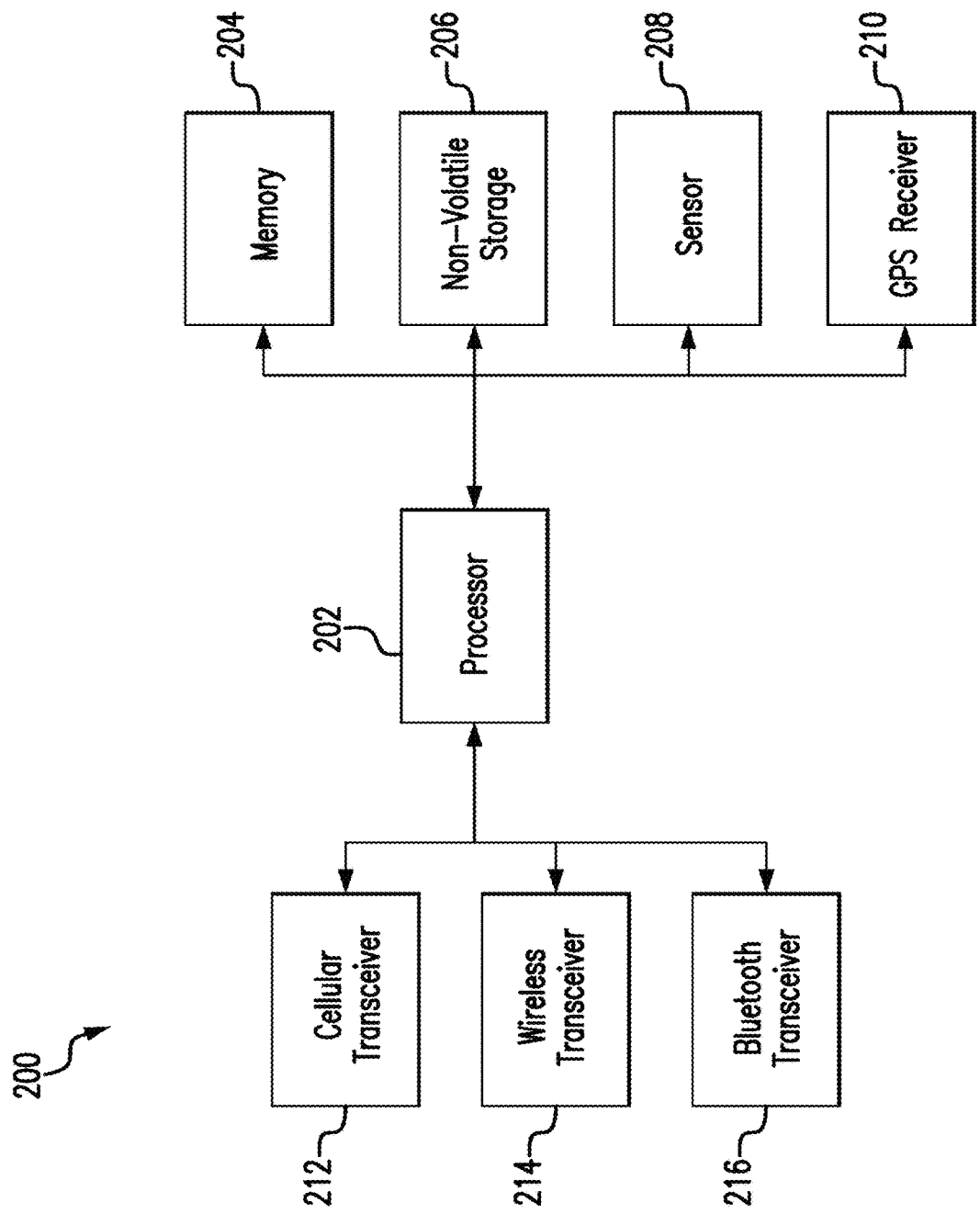
FIG. 2 illustrates a computing device according to certain non-limiting embodiments.

In one non-limiting embodiment, client station 102 can include the hardware illustrated in FIG. 2. FIG. 2 illustrates a client station or access point according to certain non-limiting embodiments. The client station 102 can be configured to collect data generated by various hardware or software components, generally referred to as sensors, present within the tracking device 102. For example, a GPS receiver 210 or one or more sensors 208, such as accelerometer, gyroscope, or any other device or component used to record, collect, or receive data regarding the movement or activity can be included within client station 102. The location of client station 102, in some non-limiting embodiments, can mimic the movement of the pet on which the tracking device is located.

While client station 102 can be attached to the collar of the pet, as described in U.S. patent application Ser. No. 14/231,615, hereby incorporated by reference in its entirety, in other embodiments client station 102 can be attached to any other item worn by the pet. In some non-limiting embodiments, client station 102 can be located on or inside the pet itself, such as, for example, a microchip implanted within the pet.

As discussed in more detail herein, client station 102 can further include a processor 202 capable of processing the one or more data collected from client station 102. Processor 202 can be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors can be implemented as a single controller, or a plurality of controllers or processors. In some embodiments, client station 102 can specifically be configured to collect, sense, or receive data, and/or pre-process data prior to transmittal. In addition to sensing, recording, and/or processing data, client station 102 can further be configured to initiate transmittal of data, including location and any other monitored or tracked data, to other devices or severs via network 108. For example, processor 202 within client station 102 can initiate the transmittal of an alert to server 106 or mobile device 104 via network 108.

In certain non-limiting embodiments, client station 102 can transmit any tracked or monitored data continuously to the network. In other non-limiting embodiments, client station 102 can discretely transmit any tracked or monitored data. Discrete transmittal can be transmitting data after a finite period of time. For example, client station 102 can transmit data once an hour or twice an hour. This can help to reduce the battery power consumed by client station 102, while also conserving network resources used for transmittal of data through the network.

As shown in FIG. 1, client station 102 can communicate with network 108. Although illustrated as a single network, network 108 can comprise multiple or a plurality of networks facilitating communication between devices. Network 108 can be a radio-based communication network that uses any available radio access technology. Available radio access technologies can include, for example, Bluetooth, WLAN, Global System for Mobile Communications (GMS), Universal Mobile Telecommunications System (UMTS), any Third Generation Partnership Project ("3GPP") Technology, including LTE, LTE-Advanced, 3G, 5G/NR technology. Network 108 can use any of the above radio access technologies, or any other available radio access technology, to communicate with tracking device 102, server 106, and/or mobile device 104.

In one embodiment, the network 108 can include a WLAN, such as a wireless fidelity ("Wi-Fi") network defined by the Institute of Electrical and Electronics Engineers (IEEE) 802.11 standard or equivalent standards. In this embodiment, network 108 can enable the transfer of location and/or any tracked or monitored data from client station 102 to server 106. Additionally, the network 108 can facilitate the transfer of data between client station 102 and mobile device 104. In an alternative embodiment, the network 108 can comprise a mobile network such as a cellular network. In this embodiment, data can be transferred between the illustrated devices in a manner similar to the embodiment wherein the network 108 is a WLAN.

In one non-limiting embodiment, client station 102 and mobile device 104 can transfer data directly between the devices. Such direct transfer can be referred to as device-to-device communication or mobile-to-mobile communication. While described in isolation, network 108 can include multiple networks. For example, network 108 can include a Bluetooth network that can help to facilitate transfers of data between client station 102 and mobile device 104, a WLAN, and a mobile or cellular network.

The system 100 can further include a mobile device 104. Mobile device 104 can be any available user equipment or mobile station, such as a mobile phone, a smart phone or multimedia device, or a tablet device. In alternative embodiments, mobile device 104 can be a computer, such as a laptop computer, provided with wireless communication capabilities, personal data or digital assistant (PDA) provided with wireless communication capabilities, portable media player, digital camera, pocket video camera, navigation unit provided with wireless communication capabilities or any combinations thereof. Mobile device 104 can communicate with a client station 102. In such non-limiting embodiments, mobile device 104 can receive location information or any other data related to a pet, such as wellness assessment and/or health recommendation from client station 102, server 106, and/or network 108.

Figure 5:
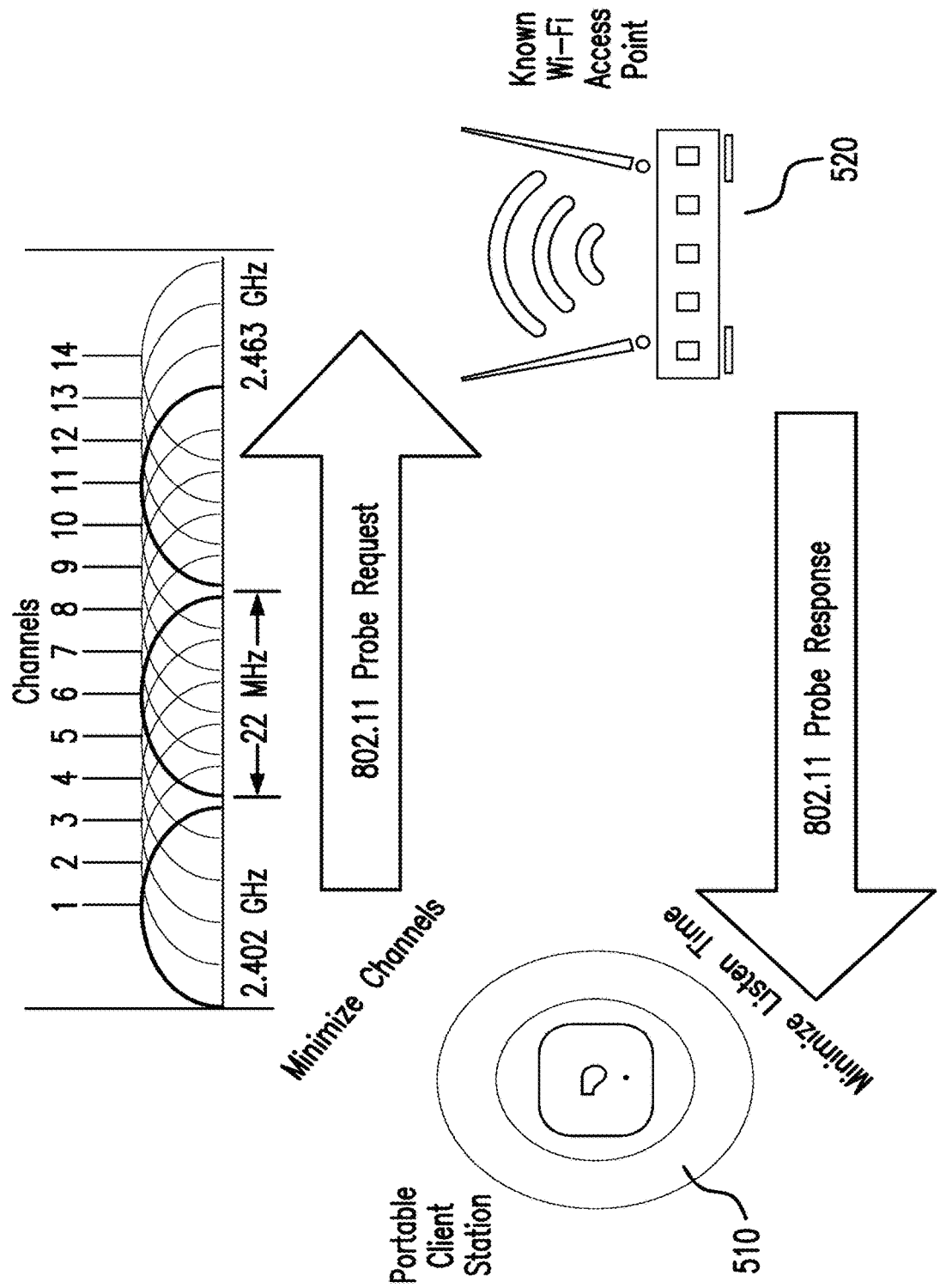
FIG. 5 illustrates a system diagram with a client station and access point according to certain non-limiting embodiments.

Additionally, client station 102 can receive data from mobile device 104, server 106, and/or network 108. In particular, as shown in FIG. 5, descried below, client station 102 can receive a probe response from the AP of the WLAN. Client station 102 can store the probe response, or information included therein, within a database of server 106. For example, the probe response can include at least one of signal strength information (SSI), success rate, or an identification of the channels from which the probe response was received. This information can be stored within the database of server 106. Client station 102 can access and use this information to determine a subset of channels and/or a scan time interval associated with a WLAN.

Mobile device 104 (or non-mobile device) can additionally communicate with server 106 or client station 102 to receive data or alerts. For example, server 106 can include one or more application servers providing a networked application or application programming interface (API). In one embodiment, mobile device 104 can be equipped with one or more mobile or web-based applications that communicates with server 106 via an API to retrieve and present data within the application. In one non-limiting embodiment, server 106 can provide visualizations or displays of location or data received from client 102. In other non-limiting embodiments mobile device 104 can communicate with client station 102 directly, and receive alerts from client station 102.

FIG. 2 illustrates a computing device according to certain non-limiting embodiments. The computing device 200 can be, for example, client station 102, server 106, or mobile device 104 shown in FIG. 1. Device 200 can include a processor 202, memory 204, non-volatile storage 206, sensor 208, GPS receiver 210, cellular transceiver 212, Bluetooth transceiver 216, and wireless transceiver 214. The device can include any other hardware, software, processor, memory, transceiver, and/or graphical user interface.

As discussed with respect to FIG. 1, computing device 200 can be a client station 102 designed to be worn, or otherwise carried, by a pet. Device 200 includes one or more sensors 208, such as a three axis accelerometer. The one or more sensors can be used in combination with GPS receiver 210, for example. GPS receiver 210 can be used along with sensor 208 which monitor the device 200 to identify its position (via GPS receiver 210) and its acceleration, for example, (via sensor 208). Although illustrated as single components, sensor 208 and GPS receiver 210 can alternatively each include multiple components providing similar functionality.

Sensor 208 and GPS receiver 210 generate data as described in more detail herein and transmits the data to other components via processor 202. Alternatively, or in conjunction with the foregoing, sensor 208 and GPS receiver 210 can transmit data to memory 204 for short-term storage. Memory 204 can be a non-volatile storage medium or any other suitable storage device, such as a non-transitory computer-readable medium, hard disk drive (HDD), RAM, flash memory, or other suitable memory.

Alternatively, or in conjunction with the foregoing, sensor 208 and GPS receiver 210 can transmit data directly to non-volatile storage medium 206. In this embodiment, processor 202 can access the data (e.g., location and/or probe data) from memory 204. In some embodiments, non-volatile storage 206 can comprise a solid-state storage device (e.g., a "flash" storage device) or a traditional storage device (e.g., a hard disk). While FIG. 2 illustrates both memory 204 and non-volatile storage medium 206, the two can be combined into one memory component referred to as either memory or non-volatile storage medium. Specifically, GPS receiver 210 can transmit location data (e.g., latitude, longitude, etc.) to processor 202, memory 204, or non-volatile storage 206 in similar manners.

As illustrated in FIG. 2, device 200 can include multiple network interfaces including cellular transceiver 212, wireless transceiver 214, and Bluetooth transceiver 216. Cellular transceiver 212 enables device 200 to transmit data, information, or an alert to a server or a mobile device via any radio access network. Additionally, processor 202 can determine the format and contents of data transmitted or received using cellular transceiver 212, wireless transceiver 214, and Bluetooth transceiver 216 based upon detected network conditions. Transceivers 212, 214, 216 can each, independently, be a transmitter, a receiver, or both a transmitter and a receiver, or a unit or device that can be configured both for transmission and reception. The transmitter and/or receiver (as far as radio parts are concerned) can also be implemented as a remote radio head which is not located in the device itself, but in a mast, for example. Wireless transceiver 214 can be used to transmit probe requests and receive probe responses to as AP of a WLAN, as shown in FIG. 4.

Figure 3:
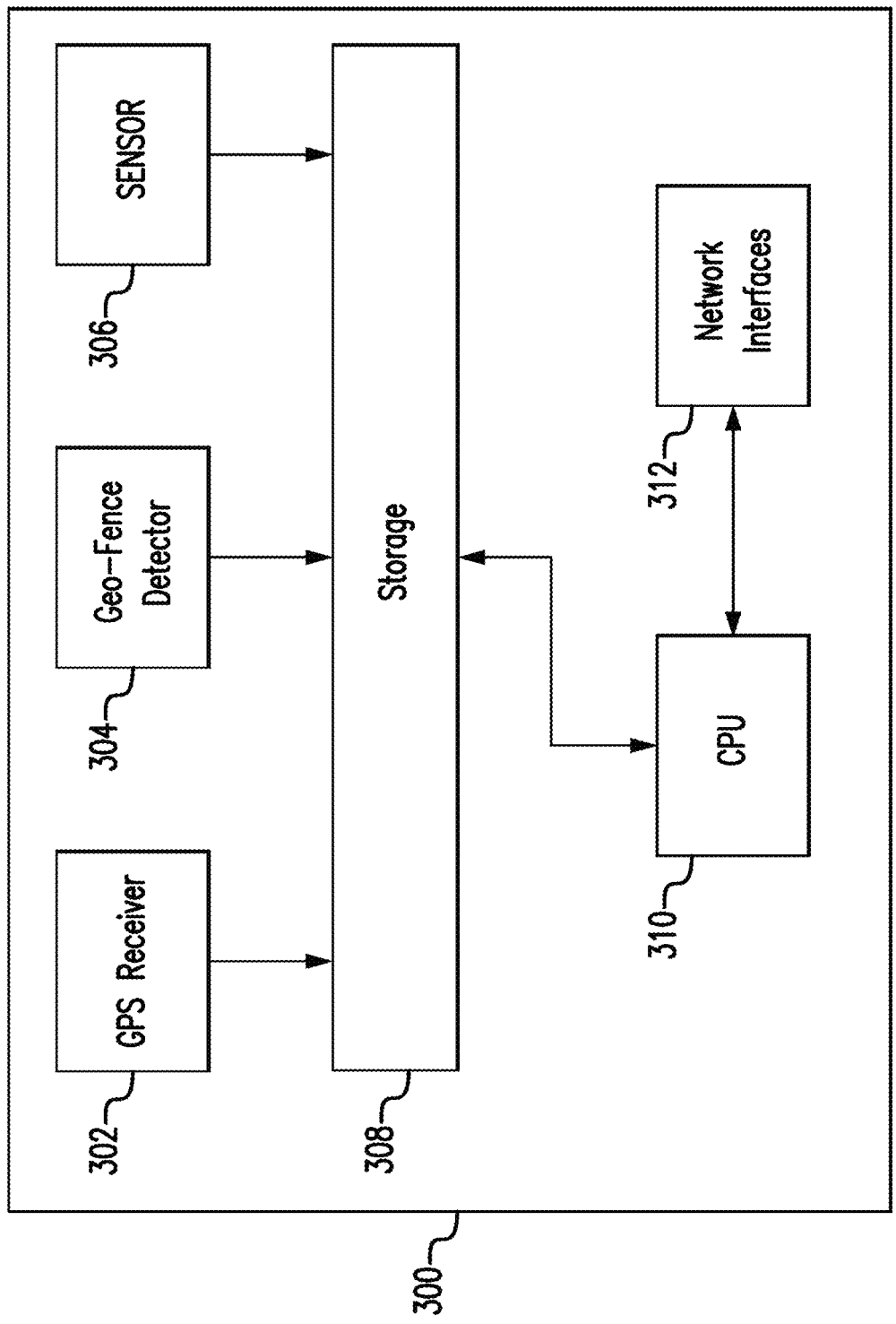
FIG. 3 illustrates a client station according to certain non-limiting embodiments.

FIG. 3 illustrates another example of the client station according to certain non-limiting embodiments. As illustrated in FIG. 3, a device 300, such as client station 102 can include a GPS receiver 302, a geo-fence detector 304, a sensor 306, storage 308, CPU 310, and network interfaces 312. GPS receiver 302, sensor 306, storage 308, and CPU 310 can be similar to GPS receiver 210, sensor 208, memory 404/non-volatile storage 206, or processor 202, respectively. Network interfaces 312 can correspond to one or more of transceivers 212, 214, 216, as shown in FIG. 2. Device 300 can also include one or more power sources, such as a battery, AC power source, or any other power source. Device 300 can also include a charging port, which can be used to charge the battery. The charging port can be, for example, a type-A universal serial bus ("USB") port, a type-B USB port, a mini-USB port, a micro-USB port, or any other type of port. In some other non-limiting embodiments, the battery of device 300 can be wirelessly charged.

In the illustrated embodiment, GPS receiver 302 records location data associated with the device 300 including numerous data points representing the location of the device 300 as a function of time. GPS receiver 302 can be turned on and off based on the location of device 300. For example, when device 300 exits a geo-fence location or zone GPS receiver 302 can be turned on, and the received GPS coordinates can be transmitted to a server or a mobile device.

In one embodiment, geo-fence detector 304 stores details regarding known geo-fence zones. For example, geo-fence detector 304 can store a plurality of latitude and longitude points for a plurality of polygonal geo-fences. The latitude and/or longitude points or coordinates can be manually inputted by the user and/or automatically detected by the wearable device. In alternative embodiments, geo-fence detector 304 can store the names of known SSIDs of known WLANs, and associate each of the SSIDs with a geo-fence. In non-limiting one embodiment, geo-fence detector 304 can store, in addition to an SSID, one or more thresholds for determining when the device 300 exits a geo-fence zone. Although illustrated as a separate component, in some embodiments, geo-fence detector 304 can be implemented within CPU 310, for example, as a software module.

In one non-limiting embodiment, GPS receiver 302 can transmit latitude and longitude data to geo-fence detector 304 via storage 308 or, alternatively, indirectly to storage 308 via CPU 310. A geo-fence can be a virtual fence or safe space defined for a given pet. The geo-fence can be defined based on a latitude and/or longitudinal coordinates and/or by the boundaries of a given WLAN connection signal. For example, geo-fence detector 304 receives the latitude and longitude data representing the current location of the device 300 and determines whether the device 300 is within or has exited a geo-fence zone. If geo-fence detector 304 determines that the device 300 has exited a geo-fence zone the geo-fence detector 304 can transmit the notification or indication to CPU 310 for further processing. After the notification has been processed by CPU 310, the notification or indication can be transmitted to the mobile device either directly or via the server.

Alternatively, geo-fence detector 304 can query network interfaces 312 to determine whether device 300 is connected to a WLAN network. In doing so, device 300 can transmit probe requests to an AP within the WLAN and wait to receive a probe response from the AP. In this embodiment, geo-fence detector 304 can compare the current WLAN SSID (or lack thereof) to a list of known SSIDs. The list of known SSIDs can be based on those WLAN connections that have been previously approved by the user. The user, for example, can be asked to approve an SSID as a home geo-fence location or zone during the set-up process for a given wearable device. In another example, the list of known SSIDs can be automatically populated based on those WLAN connections already known to the mobile device of the user. If geo-fence detector 304 does not detect that the device 300 is currently connected to a known SSID, geo-fence detector 304 can transmit a notification to CPU 310 that the device has exited a geo-fence zone.

Alternatively, or in addition to, geo-fence detector 304 can receive the strength of a WLAN network and determine whether the current strength of a WLAN connection is within a pre-determined threshold. The signal strength can take the form of a SSI, and can be included in a probe response received at client station 102. In certain non-limiting embodiments, when a client station is determined to be within the presence of a known WLAN connection, meaning that the client station can be within the transmission range of a given access point, the client station can be placed in a low-power mode. The low-power mode can help to preserve the client station's battery. If the WLAN connection is outside the pre-determined threshold, the wearable device can be nearing the outer border of the geo-fence. Receiving a notification once a network strength threshold is surpassed can allow a user to receiver a preemptive warning that the pet is about to exit the geo-fence.

As illustrated in FIG. 3, device 300 further includes storage 308. In one embodiment, storage 308 can temporarily or preeminently store data sensed or received by device 300. For example, storage 308 can store information included within a probe response. In other non-limiting embodiments, instead of storing previously sensed and/or received data in storage 308, device 300 can transmit the data to be stored in a database of a server, such as server 106 shown in FIG. 1.

FIG. 4A illustrates a database according to certain non-limiting embodiments. The database 400 can be located in the non-volatile storage of mobile device 104 shown in FIG. 1. Database 400 can be referred to as an event manager (EVTMGR). Client station 102 or mobile device 104 can read, write, or erase data from the database. For example, mobile device 104 can read data from the database and/or upload the read data to server 106 periodically or non-periodically. In other examples Mobile device 104 can write data to database 106, such as pet activity data, debug logging, calibration data associated with the scanning algorithm, and/or any other available data. In certain embodiments, database 400 can be included in non-volatile storage and help manage the data stored therein. Alternatively, the database can operate or be included in any other hardware or cloud-based memory. In the example embodiment shown in FIG. 4A, database 400 can include status block 410, block pointer 420, and/or data blocks 430. In some embodiments each of the components of database 400 can have a reserved section within the non-volatile memory.

FIG. 4B illustrates a database according to certain non-limiting embodiments. In particular, FIG. 4B illustrates a detailed example of the database shown in FIG. 4A. Database 400 can be an ultra-low footprint storage system that can be used in embedded systems. Database 400 supports writing, reading, and erasing data blocks, such as opaque data blocks, in a circular, first-in-first-out (FIFO) fashion, to a non-volatile memory. In certain embodiments, data included within the database can be read in the order it was written. Such embodiments can help to provide a simplified configuration that can reduce the quantity of resources used by the database.

Data blocks 430 of database 400 can include one or more data blocks. The total number of blocks can be referred to as "N." A data block can be a contiguous string of bytes living somewhere in the non-volatile memory. In certain embodiments the data can be unaccompanied by any metadata. Rather, the metadata, which can include, for example, the length of the data block, checksum for verifying the data block, address of the data block, or any other form of metadata, can be kept in block pointer 420. Block pointer 420 can include one or more block pointers. FIG. 4B, for example, illustrates seven block pointers. A single block pointer can hold the metadata for a single data block. The metadata can include the address of the data, the length of the data, and/or a checksum that can be used to verify the integrity of the data. In certain embodiments, the data can have a length of 256 bytes. In other embodiments the length of the data can be larger or smaller than 256 bytes.

Status block 410 can be used to hold the head and tail status of the database. In other words, status block 410 can be a pointer to block pointers 420. Status block 410 provides a high-level picture of where the storage system can be read from and/or written to. In certain non-limiting embodiments a fresh or updated copy of the read or write block pointer addresses can be kept. The read pointer address can be kept in a tail pointer address, illustrated as tail ptr in FIG. 4B, while the write pointer address can be kept in a head pointer address, illustrated as head ptr in FIG. 4B. In other words, the head pointer address can be used to write data onto the next available block, and the tail pointer address can be used to read data onto the next available or oldest data block.

When a user or client station wishes to store an opaque block of data, meaning a client station would like to write data onto database 400, the client can send the data to database 400, along with the length of the data. Status block 410 can then calculate a checksum, retrieve the next available free memory address, and write the data to the non-volatile storage medium or memory. If the non-volatile memory is completely full, the oldest data block can be overwritten, and the corresponding block pointer can be updated. Status block 410 can then construct a block pointer for the data, and write the constructed block pointer to block pointer 420. If block pointer memory is full, the oldest block pointer can be overwritten and the corresponding data can be erased. Status block 410 can then be updated to reflect the new head pointer.

In certain other non-limiting embodiments, a client station can read data from database 400, for example when uploading to a server. The read or tail address of status 410 can indicate where the oldest read block pointer is located or from where the oldest read block can be retrieved. Using this address, status block 410 can locate the first block pointer to read. Using the metadata in block pointer 420, the data block can be read at the retrieved address, and up to the length specified in the block pointer. The data can then be validated against its checksum to confirm integrity, and returned to the client station. If the client station successfully uploads the data to the server, the client station can send a notification to database 400. Sending the notification can be similar to performing an erase. Database 400 can advance the tail pointer inside of status block 410, thereby losing track of the data to which the block pointer is associated. In certain embodiments, the above reading of the data can continue looping until all the data has been read, or until the client station has read its desired number of stored bytes.

For example, the client station can periodically upload stored data to the server, so that the server can present relevant data, such as pet activity, location, and/or usage statistics, to the user via the mobile phone application. Periodically, the client station can establish a connection to the server and transmit some or all of the data available to the client station in the database to the server. The server can acknowledge that the transmission was successful via a notification, for example using an HTTP status code 200. Once the notification is received the data can be treated as having been successfully consumed and the block pointers can be advanced. Advancing the block pointers can erase or effectively erase the data that was stored, and free space on the client station's non-volatile memory for new data.

In certain embodiments, erasing data or metadata can occur as a result of reading a data block, and then moving the block pointer address that was pointing to the data block forward. In other words, because of the FIFO nature of database 400, erasing can merely include advancing the tail pointer inside the status block.

FIG. 5 illustrates a system diagram with a client station and access point according to certain non-limiting embodiments. Client station 510 can be similar to client station 210 shown in FIG. 2. The In some examples, client station 510 can be a portable, wearable device that can be attached to a pet or animal collar. Client station 510 can include medial access control (MAC) and/or physical layer (PHY) interface used to transmit probe requests and receive or listen to probe responses from an AP over a WLAN. AP 520, for example, can be a network router or base station for the WLAN. The WLAN can be defined by the IEEE 802.11 standard or equivalent standards.

Although FIG. 5 and the below description focus on the 2.4 GHz radio frequency band, any of the below embodiments can also utilize a 5 GHz band, as described at least in IEEE 802.11(n) or (ac) protocols. In a 2.4 GHz band, the WLAN is limited to 14 different channels. As shown in FIG. 5, the 2.4 GHz band can range from a radio frequency of 2.402 to 2.483 GHz. Each of the channels can be 20 megahertz (MHz) wide, with the channel centers being separated by 5 MHz to avoid channel overlap. By avoiding channel overlap, WLANs can help suppress harmful signal interference caused by usage of adjacent channels. As such, the 2.4 GHz band can offer at most three non-overlapping channels, channels 1, 6, and 11. On the other hand, the 5 GHz band provides for a larger frequency range, which can offer as many as 24 non-overlapping channels.

To communicate with the WLAN, client station 510 transmits a probe request to AP 520 on one or more channels of the WLAN. The probe request, also referred to as a probe request frame, can be a specific WLAN frame transmitted from client station 510 requesting information from a single AP 520 or from all APs within a given area. Client station 510 can then wait or listen for a finite period of time, referred to as a scan interval, to receive the probe response from AP 520. The probe response received at client station 510 from AP 520 can include any information related to the WLAN or AP, such as SSI, probe response success rate, or an identification of the channels from which the probe response was received. Probe responses, in other words, can include some of the same information used by a client station to initiate communication with the AP.

Certain non-limiting embodiments are directed to reduce or minimize the scan time interval, while also reducing or minimizing the number of channels through which the probe requests are transmitted. Doing so can help to reduce battery usage at the client station, while also reducing network resources associated with transmitting and receiving probe requests and responses. In addition, reducing the scan interval and number of channels through which probe request are transmitted can help to reduce the execution time for identifying of the location of the client station, as well as the time spent by the client station to communicate with the WLAN. This can help to elongate the battery life of the client station, while also limiting the network bandwidth resources used by the client station. As will be discussed below, the scan interval and subset of channels used by the client station can be determined based on previously information stored in the database that can be accessed by the client station.

As shown in FIG. 5, client station 510 can periodically transmit probe request frames, and listen for a set amount of time for a probe response from AP 520 or a particular AP located in a given WLAN. To reduce the power and total time spent performing the scan from the client station's perspective, the WLAN channels on which the probe requests are transmitted can be reduced. In addition, the amount of time spent listening for a probe response from the AP, also known as a scan time interval (STI) or scan interval, can be reduced.

Figure 6:
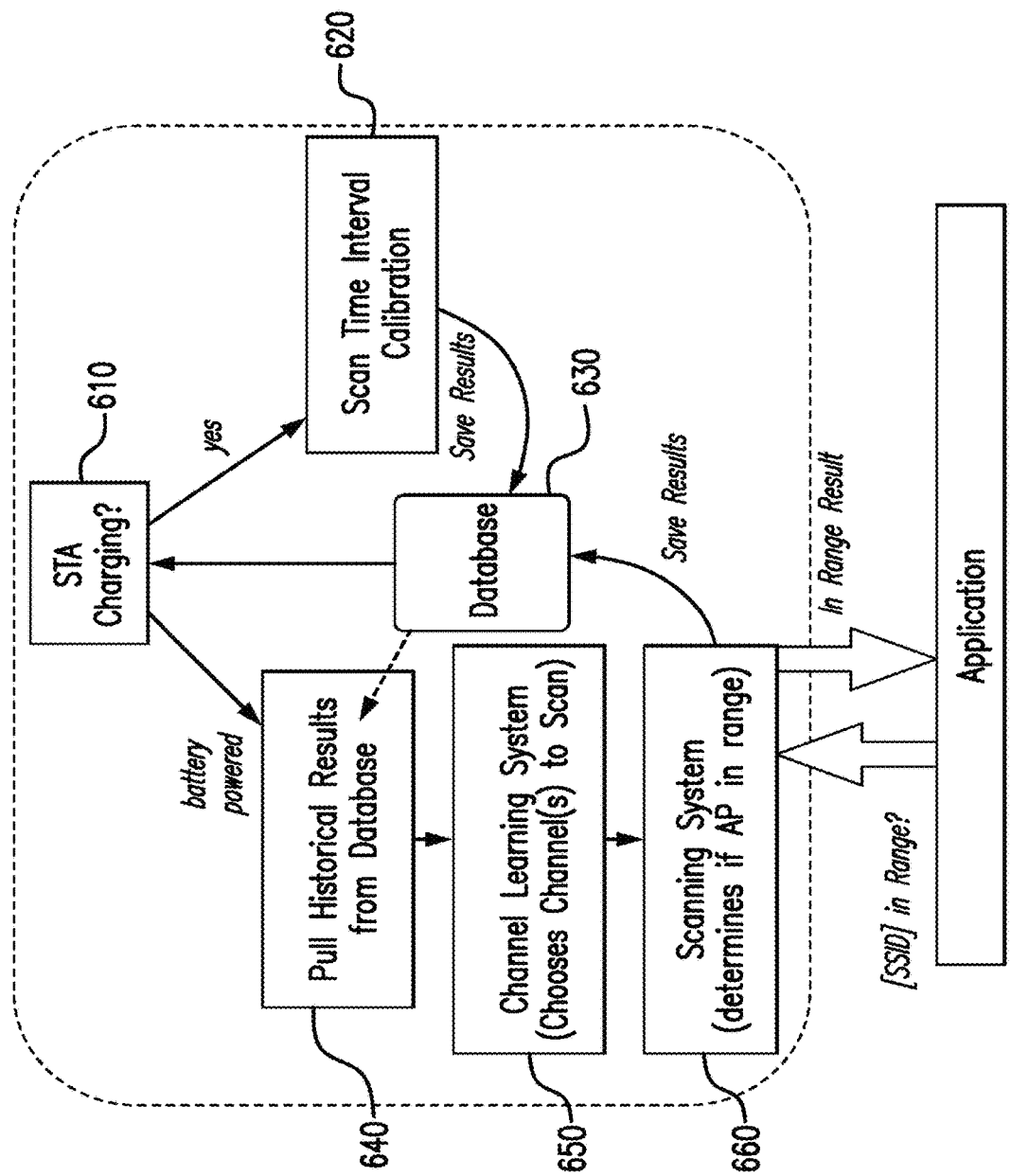
FIG. 6 illustrates a system flow diagram that describes a system or method according to certain non-limiting embodiments.

FIG. 6 illustrates a system flow diagram that describes a system or method according to certain non-limiting embodiments. In some embodiments the method shown in FIG. 6 can operate without any user interaction, meaning that the method can be undetected by the user. As shown in 610, the client station, referred to as STA in FIG. 6, can determine whether it is connected to a battery charger. As shown in 620, the calibration of the scan interval can occur while the client station is connected to a charging source, such as a battery charger. Calibrating while the client station is connected to the charging source helps to reduce the calibration's impact of the device's battery between charges. In some other embodiments, however, the scan time interval can also be calibrated when the client station is not charging. This can allow the client station to account for APs that are not located within the vicinity of the charging station.

Calibrating the scan time interval can mean determining the amount of time the client station listens for a probe response to be transmitted from an AP on a given channel of the WLAN. The scan interval can be specific to a given channel within the WLAN or can be specific to a given SSID. When scanning for a specific SSID, without knowing which particular APs are in range of the client station, a client station can adopt the highest scan time interval amongst all the APs in the SSID for which the client station is calibrated. For example, the highest scan time interval can be 200 milliseconds (ms), 500 ms, 1 second, or 5 seconds. In other examples the highest scan time interval can be lower than 200 ms or larger than 5 seconds. Information associated with the scan time interval can be collected and/or stored on a per AP or BSSID basis.

In some non-limiting embodiments, the calibration can be performed as frequently as device operation will allow, while in other embodiments the calibration can be limited to a finite number of times for a given period of time. For example, the calibration can be performed once a day, once every other day, or once a week. The purpose of the calibration of the scan time interval can be to determine a minimum scan interval such that an asymptote has been reached in the success rate at which the probe response is received at the client station from the AP given a statistically significant number of trials.

Figure 7:
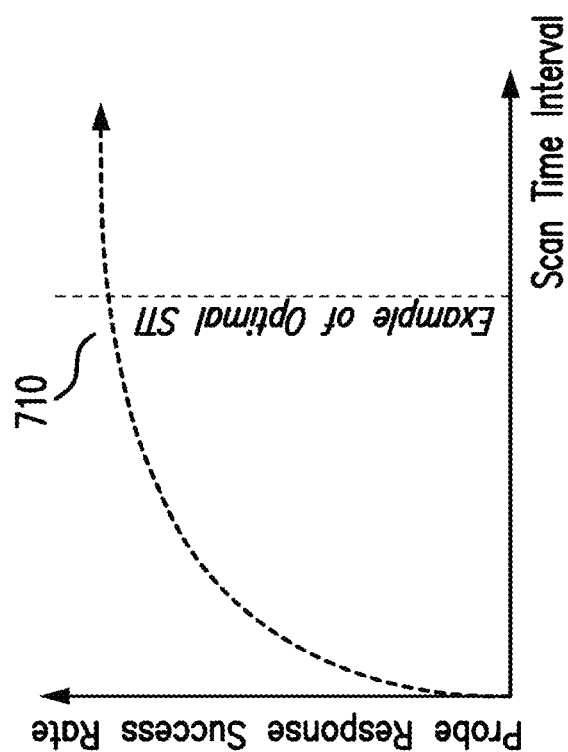
FIG. 7 illustrates a scan time interval chart according to certain embodiments.

An example of such an asymptote is shown in FIG. 7. In particular, FIG. 7 illustrates a scan time interval chart according to certain embodiments. Dashed line 710 can be used to mark the point in the asymptote at which the probe response success rate levels off. The scan interval time at which the probe response success rate levels off can serve as the determined scan interval time used by the client station. In other words, determining a scan time interval associated with the SSID can include calibration of the scan time interval.

In certain non-limiting embodiments shown in FIG. 6, when client station 610 is charging, and not running solely on battery power, scan time interval calibration 620 can occur. The scan time interval calibration can include performing a multi-channel scan using a high scan time interval. The multi-channel scan can include sending probe requests to a plurality of channels within an SSID of the WLAN. The initial high scan time interval can help to establish a baseline probe response success rate. The results of the multi-channel scan can be stored in the database. The multi-channel scan can be repeated more than once. For example, the multi-channel scan can be repeated three or more times.

If the AP does not respond during any of the performed multi-channel scans, the calibration cannot take place. On the other hand, if the AP responded at least once, the client station can continue to perform multi-channel scans. In some examples, if the AP responds ten or more multi-channel scans directed to the specific AP can be performed. For each multi-channel scan performed, the client station can keep track or store in the database the probe response received at the client station. The probe response, for example, can include at least one of signal strength information, such as a received signal strength indicator (RSSI), the probe success rate, meaning whether a response was received after a probe request was transmitted, and/or an identification of the channels from which the probe response was received. The client station can calculate not only the probe success rate, but also other metrics such as the standard deviation of the success rate.

The above information included within the probe response, and/or the calculated success rate metrics, can be transmitted to the server and stored in the database. The stored information can be accessed to determine the scan time interval associated with the SSID. For example, in certain non-limiting embodiments a binary search can be performed to determine the scan time interval. The binary search can be performed by the client station and/or by the server that contains the database. Binary search, also known as the half-interval search or binary chop, can be a search method used to find a target value within a sorted list of probe response success rates. In particular, binary search can act to repeatedly divide in half the portion of the list probe response success rates that could contain the target scan time interval, until the list is narrowed down to an optimal or minimum scan time interval, with an acceptable success rate level.

The binary search can be based on at least one of the signal strength information or probe response success rate. Given that the binary search is performed as part of the calibration, in certain embodiments the binary search can be performed when the client station is charging. Using the binary search, the multi-channel scan can be repeated by the client station until a scan interval is identified in which the success rate is 50% or less from the success rate previously achieved. The binary search can be performed while the client station continues to collect data using the multi-channel scan. During the collection of data, the client station can continue to favor the side of the binary search with the higher success rate. When a scan time interval associated with a given success rate is found to have a similar standard deviation, with a success rate that is within 0.5 of the previously used scan time interval, the client station or server can determine or choose such a scan time interval.

Once a given scan interval is chosen, the binary search can continue by focusing on the chosen scan interval and the lowest scan interval that had a poor or failed success rate. In other words, the binary search can attempt to determine if the scan time interval can be lowered or minimized even further. In certain non-limiting embodiments, when the difference between the standard deviation and success rate of two binary search nodes begin to diverge, the client station or server can determine that the last chosen scan time interval is the minimum scan interval that can be used. In other words, the client station or server can determine that the last chosen scan time interval reflects the success rate asymptote, as shown in FIG. 7.

The results of the scan time interval calibration can be stored in the database, as shown in step 630 of FIG. 6. The results of the calibration can include one or more of the determined scan time intervals, mean probe response success rates, probe response success rate standard deviations, mean signal strengths, and/or standard deviation of the signal strengths, or any other metrics. In addition to determining the scan time interval, certain embodiments can also determine a subset of channels via which the probe requests can be transmitted. As shown in step 640, the client station can attempt to pull historical results and associated calculations from the database. If the database does not include any historical results or a sufficient number of historical results, a channel learning method can be performed to choose, select, or determine the subset of channels, as shown in step 650. In certain embodiments the channel learning method can be performed before calibration of the scan time interval, while in other non-limiting embodiments the channel learning method can be performed after calibration of the scan time interval.

As discussed above, a 2.4 GHz WLAN radio frequency band can include 14 different channels on which an AP can receive probe requests and/or transmit probe responses. In some non-limiting embodiments, the AP can switch between the WLAN channels. When a client station transmits a probe request on a channel not used by a given AP, the client station will not receive a probe response from the given AP. In addition, if multiple APs share the same SSID, meaning that they are located within a similar area of the WLAN, each AP can use a different channel. Certain embodiments disclosed herein provide a system or method that can dynamically adapt and learn the best channel or channels to scan for when searching for a particular SSID. In certain embodiments the channel scan can be performed for a particular SSID, while in other embodiments the channel scan can be performed on a per-AP or BSSID basis.

Figure 8:
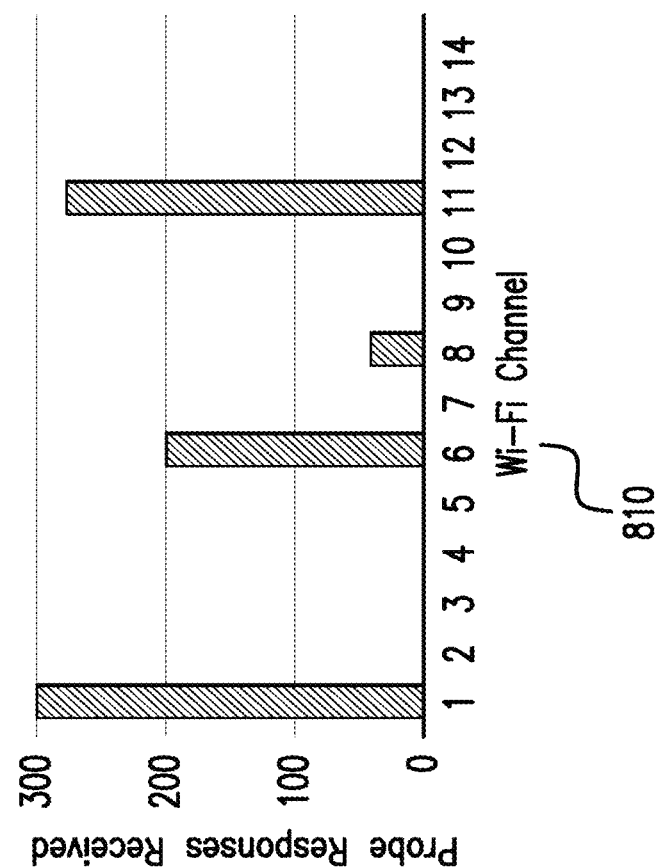
FIG. 8 illustrates a chart of WLAN channels according to certain embodiments.

FIG. 8 illustrates a chart of WLAN channels 810 according to certain embodiments. While FIG. 8 illustrates an example of a WLAN using a 2.4 GHz band, certain other embodiments can use a 5 GHz band. As discussed above, a WLAN using a 2.4 GHz radio frequency band can have 14 possible channels via which the AP can communicate. As can be seen in the histogram shown in FIG. 8, there are 14 possible channels. 300 probe responses have been received via channel 1, 200 probe responses have been received via channel 6, 275 probe response have been received from channel 11, and an additional 40 responses have been received in channel 8. While the histogram suggests that the client station should only transmit on channels 1, 6, and 11, it can be beneficial to account for the responses received in channel 8. It can be possible, for example, that the last 40 occurrences have all been transmitted from the AP on channel 8, suggesting that the client station should transmit probe requests via channel 8, as opposed to channels 1, 6, or 11. The embodiments describes herein can dynamically account for all of the channels, including any channel trends exhibited by the AP.

In certain non-limiting embodiments, the channel learning system, process, or method shown in step 650 of FIG. 6 can utilize a circular buffer. For example, "K" can be a number of elements in a rolling or circular first-in, first-out (FIFO) buffer, which can be used in the construction of a channel occurrence histogram. While "K" can be any number, in certain embodiments discussed below K can assume a value of 150.

An observed channel can be stored in a FIFO buffer included in the database. If the buffer is full, the oldest element included within the buffer can be discarded. The element can refer to the identification of a channel through which the probe response was received at the client station. In some non-limiting embodiments the buffer can be populated with a new element when a scan was successful, meaning that a probe response was received at the client stations. The subset of channels can be determined based on at least one of a latest or most occurring of the channels stored in the buffer. The determined subset of channels can include one or more channels. In a 2.4 GHz band, the subset of channels can include between 1 to 14 channels, which can include up to 3 non-overlapping channels. In a 5 GHz band, on the hand, the subset of channels can include 24 non-overlapping channels.

One or more criteria can be used to determine the latest or most occurring of the channels stored in the buffer. For example, in certain embodiments if a channel appears in K/2 occurrences in the buffer then it can be deemed the latest or most occurring channel. For example, if channel 6 appears 75 times or more in a buffer of 150 occurrences then channel 6 can be deemed the most occurring channel. In such an embodiment the client station can choose to transmit probe requests only on channel 6, given that it has been determined to be the most occurring channel. In another example, any channel that has K/5 or more occurrences can be included in the subset. For example, channels 1, 6, and 11 can each appear 50 times in the buffer. In such an embodiment, the client station can determine the subset of channels to be channels 1, 6, and 11, and transmit probe requests only on those three channels. If no channels meet the above criteria, the client station can choose to forgo the subset scan altogether and perform a multi-channel scan, meaning that the client station transmits probe requests on all channels. In other words, if the one or more criteria is not met, in certain embodiments no subset of channels can be selected and the client station can perform a multi-channel scan.

Once the subset of channels and/or the scan interval are determined, a client station can perform a scan based on the and determined subset of channels and/or scan interval, as shown in step 660. The scan can help to determine whether a given AP is located within range of a client station. In other words, the client station can use the scan to confirm that the client station is located in a pre-determined geo-fence zone or outside a pre-determined geo-fence zone.

If the client station is determined to be located outside a geo-fence zone, an indication that the client station has exited the pre-determined geo-fence zone can be transmitted to a mobile device, a user equipment, or a web-based application included therein. The indication can be any form of notification emitted through the graphical user interface, speaker, or vibration device of the user equipment. For example, the indication can be an alert displayed on the graphical user interface of the mobile device or user equipment. In yet another example, the indication can be a sound emitted through the speaker of the mobile device. In certain non-limiting embodiments, an indication that the client station has exited the geo-fence location or zone can be reflected in the client station. For example, an illumination device located in the client station can be turned on. The illumination device can include a light emitting diode (LED).

Figure 9:
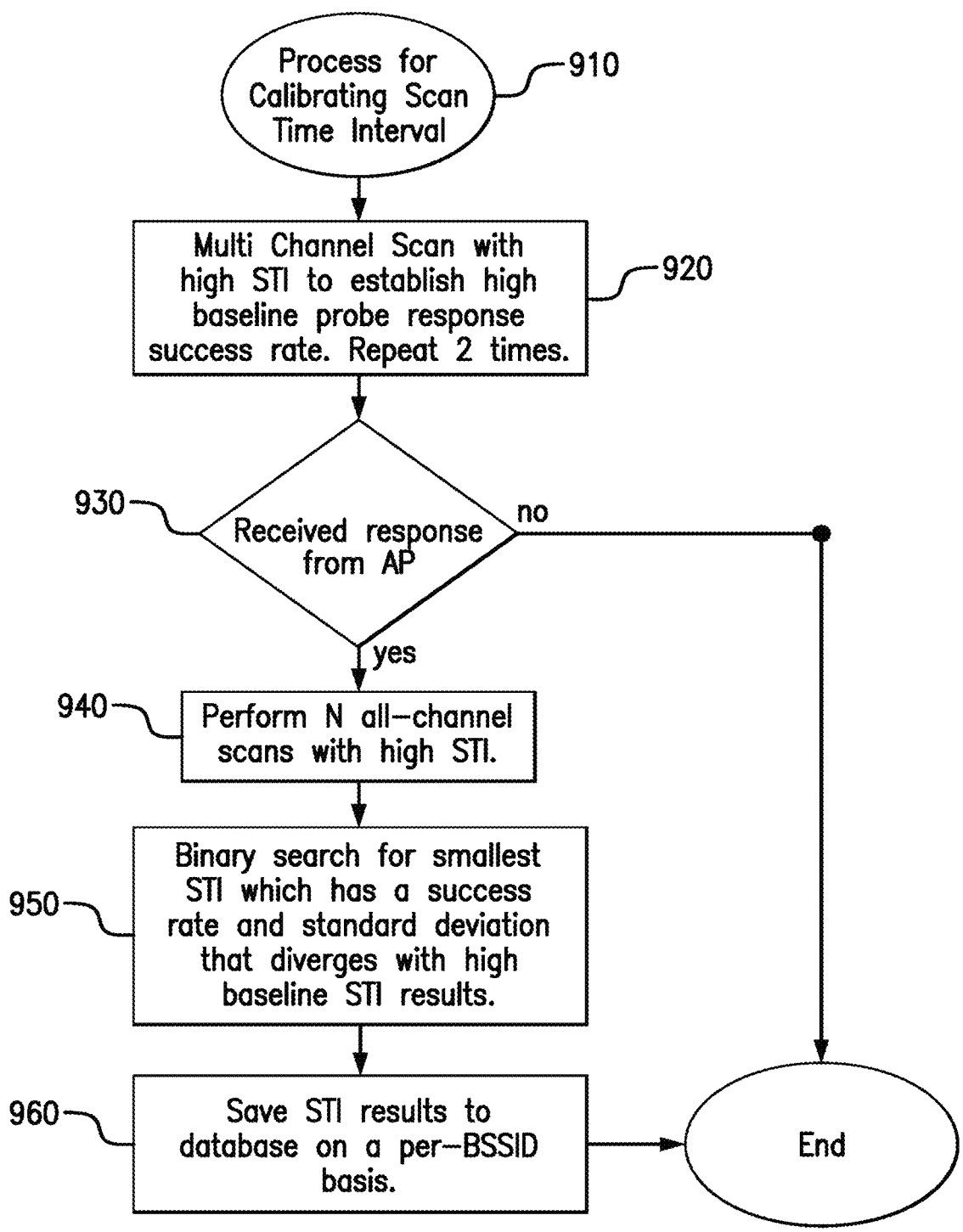
FIG. 9 illustrates a flow diagram according to certain non-limiting embodiments.

FIG. 9 illustrates a flow diagram according to certain non-limiting embodiments. In particular, FIG. 9 illustrates determining the scan time interval while the client station is charging, as shown in step 620 of FIG. 6. In step 910, the server or client station can initiate or begin the process of calibrating the scan time interval. In step 920, the client station can perform a multi-channel scan using a high scan time interval to establish a high baseline probe response success rate. The multi-channel scan can be repeated 2 or more times. In step 930, the client station can evaluate whether it received a probe response from the AP. If not, the calibration can end. If the probe response is received, the multi-channel scan with a high scan time interval can be performed for "N" number of times, as shown in step 940. In step 950, a binary search can be performed for the smallest scan time interval, which has a success rate and standard deviation that diverges with the high baseline scan time interval results. The determined scan time interval results can then be stored in the database of the per-AP or per-BSSID basis.

Figure 10:
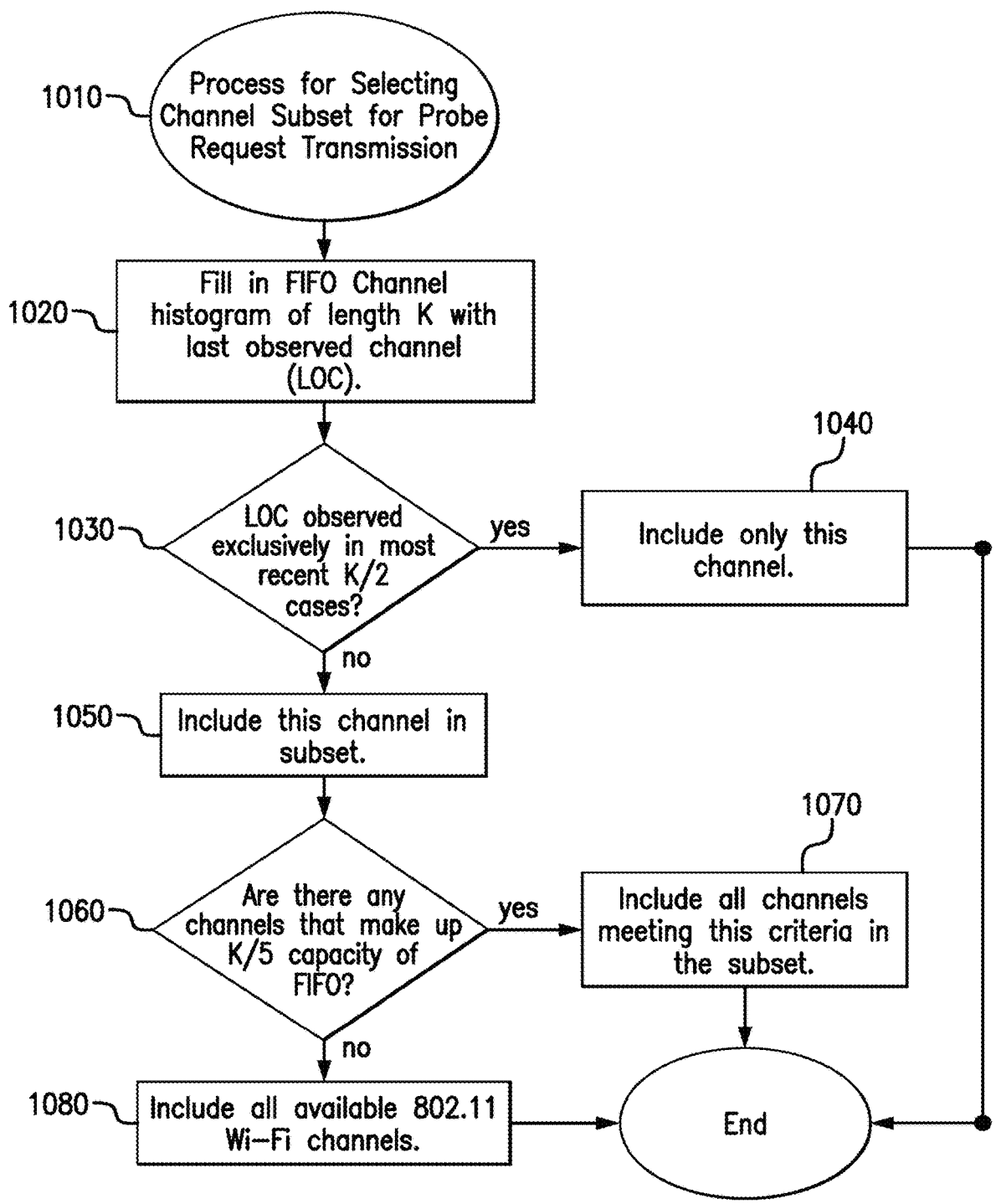
FIG. 10 illustrates a flow diagram according to certain non-limiting embodiments.

FIG. 10 illustrates a flow diagram according to certain non-limiting embodiments. In particular, FIG. 10 illustrates determining a subset of channels using a channel learning system, as shown in step 650 of FIG. 6. In step 1010, the process for selecting a channel subset for the probe request transmission can begin. In step 1020, the FIFO channel circular buffer having a length K can be used to determine the last or most observed channel. The client station or server can then determine whether a given channel appears K/2 times or more in the buffer, as shown in step 1030. If so, the given channel can be the only channel included in the channel subset, as shown in step 1040. If not, the channel can be included in the subset of channels, as shown in step 1050. In step 1060, the client station or server can determine if any of the channels occur K/5 times or more in the buffer. If so, all of those channels that meet the K/5 criteria can be included in the subset, as shown in step 1070. If not, and none of the above criteria are met, the client station can merely perform a multi-channel scan.

Figure 11:
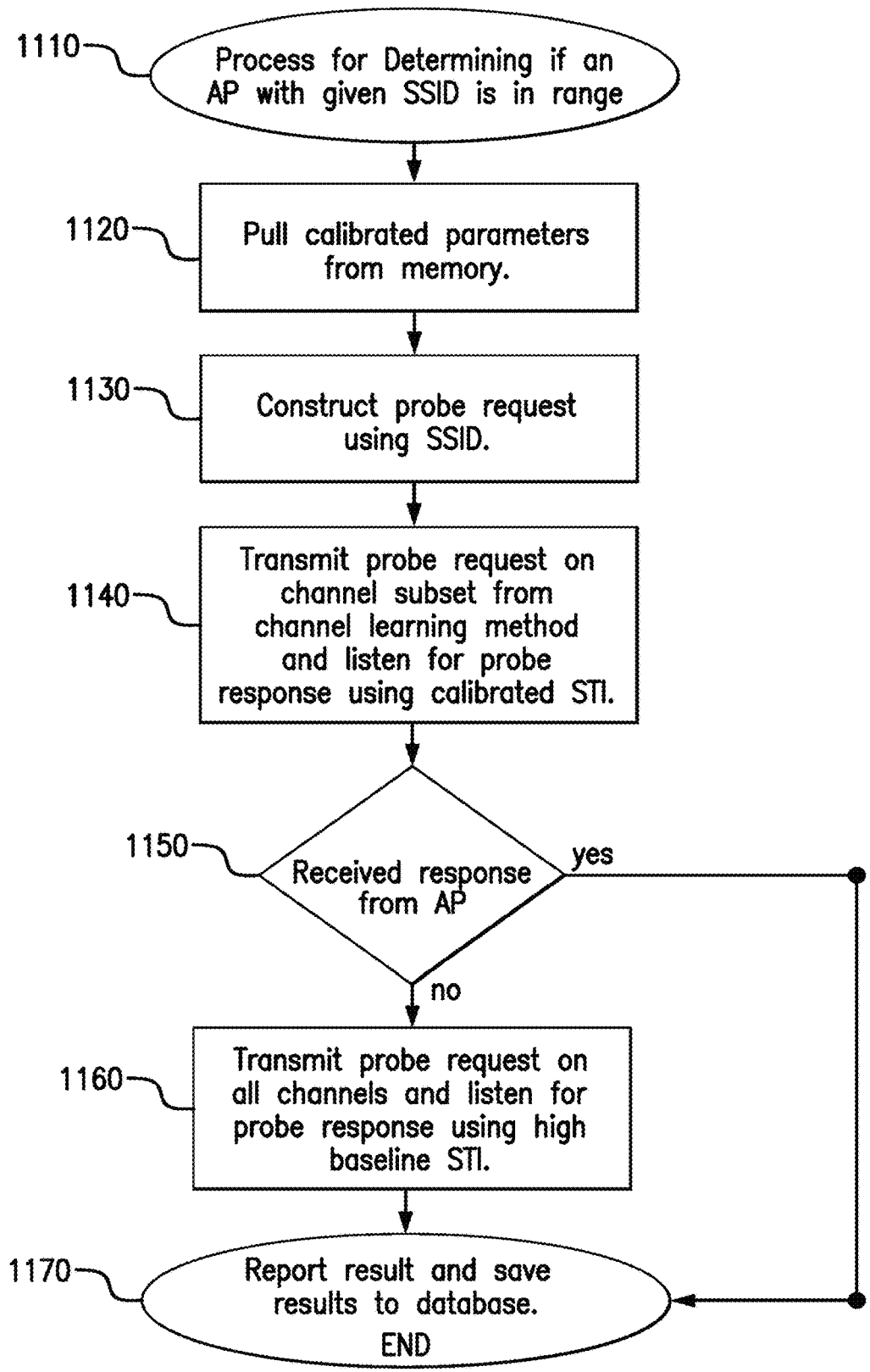
FIG. 11 illustrates a flow diagram according to certain non-limiting embodiments.

FIG. 11 illustrates a flow diagram according to certain non-limiting embodiments. In step 1110, the process for determining whether an AP within a given SSID is in range can be initiated. The client station can sense or detect an SSID for a WLAN. In step 1120 the client station can pull calibrated parameters from the memory or a database located within the memory. In other words, the client station can determine a subset of channels within the WLAN by accessing information stored in the database. The client station can also determine a scan time interval associated with the SSID by accessing the information stored in the database. In step 1130, a probe request can be constructed using the SSID. The probe request can then be transmitted via the determined channel subset. In other words, the probe request can be transmitted on the determined channel subset using the channel learning method, as shown in step 1140.

In step 1150, the client station can evaluate whether a probe response was received from the AP. If the probe response is received at the client station from the AP during the determined scan time interval, the probe response can be stored by the client station in the database, as shown in step 1170. If the probe response is not received, a multi-channel scan can be performed by the client station using a high scan time interval.

In certain non-limiting embodiments, the AP located within a wireless access network can receive a probe request from a client station through a subset of channels. The AP can also transmit a probe response to the client station during a scan time interval. The probe response can be used to confirm that the client station is inside or outside a geo-fence zone.

Figure 12A:
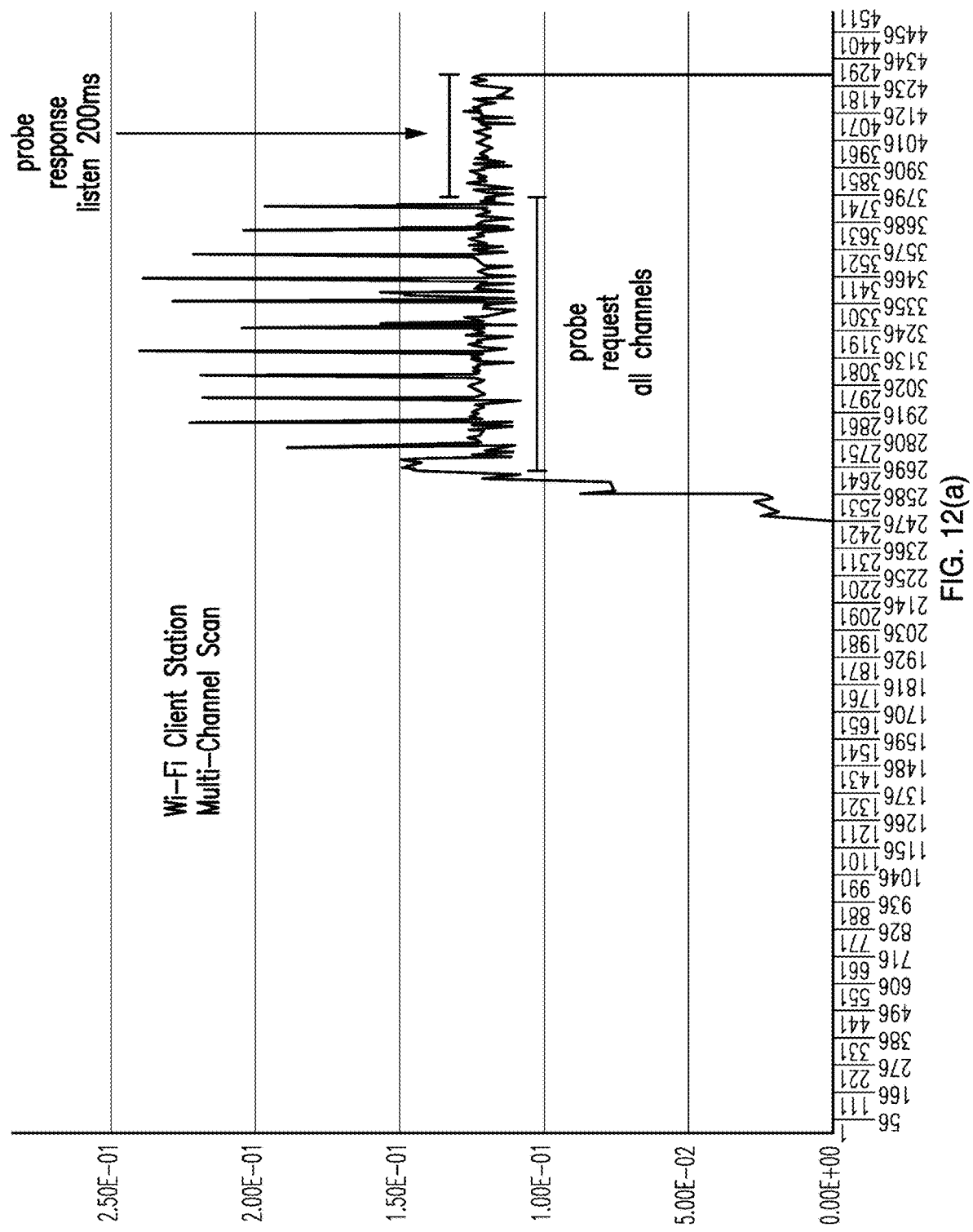
FIG. 12(a) illustrates a probe response chart according to certain embodiments.

FIG. 12(a) illustrates a probe response chart according to certain embodiments. In particular, FIG. 12(a) illustrates a multi-channel scan performed by the client station, with the x-axis representing time, and the y-axis representing power consumption. As can be seen in the chart, a large high amount of power can be consumed for transmitting the probe requests on all channels, while the scan time interval or the probe response listen time can be 200 millisecond (ms) in length. The multi-channel scan can consume an average of 475 milliwatts (mW) over 1.8 seconds of transmitting probe requests.

Figure 12B:
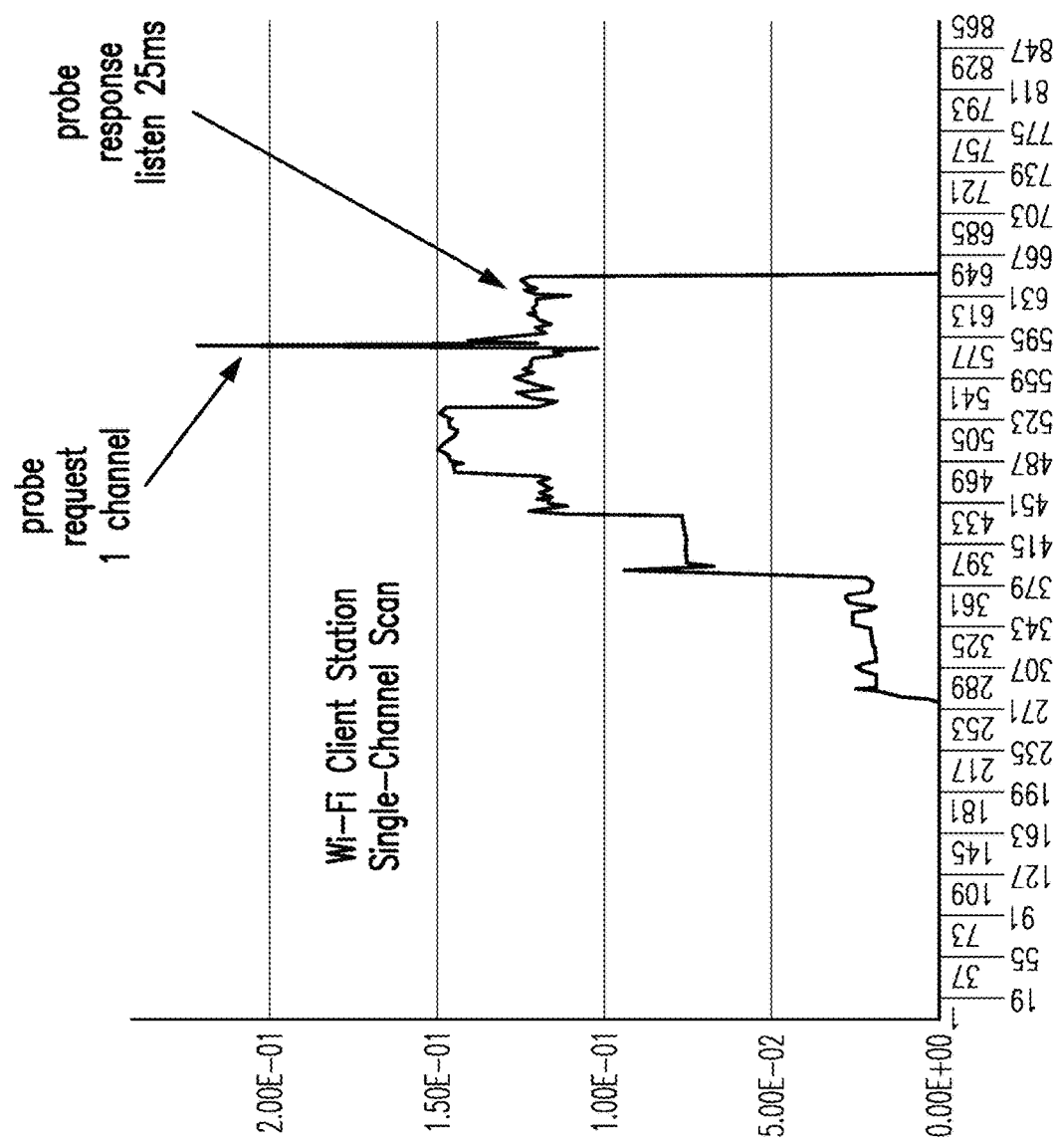
FIG. 12(b) illustrates a probe response chart according to certain embodiments.

FIG. 12(b) illustrates a probe response chart according to certain embodiments. In particular, FIG. 12(b) illustrates an embodiment that utilizes the systems, methods, and apparatus disclosed above and in FIGS. 1-11. As shown in FIG. 12(b), a probe request can be transmitted on only a single channel, while the scan time interval or the probe response listen time can be reduced to 25 ms. Using the above embodiments can help to reduce the power consumption to an average of 360 mW over 380 ms.

The embodiments disclosed above, therefore, help to improve both the client station and the AP itself by reducing the network resources used by the client station. Reducing the network resources can help to decrease the battery consumption of the client station by decreasing the amount of time and battery resources needed to identify the location of the client station relative to an AP in the WLAN. From the perspective of the network, on the other hand, resources can be conserved by decreasing the number of multi-channel scans performed by the client station. This can help to prevent the client station from indiscriminately flooding the channels of the WLAN with probe requests. The systems, methods, and apparatus described above therefore help to provide improvements to the functioning of the client station, AP, and other components of the WLAN network.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method comprising:
    sensing at a client station a service set identifier for a wireless access network;
    determining a subset of channels within the wireless access network by accessing information stored in a database;
    determining a scan time interval associated with the service set identifier by accessing the information stored in the database;
    transmitting a probe request through the subset of channels to an access point located within the wireless access network;
    receiving a probe response at the client station from the access point during the scan time interval;
    storing the probe response received at the client station in the database, wherein the probe response comprises at least one of signal strength information, success rate, or an identification of the channels from which the probe response was received; and
    identifying location of the client station based on the probe response.

2. The method of claim 1, further comprising:
    confirming that the client station is located outside a pre-determined geo-fence zone based on the identified location; and
    transmitting an indication to a user equipment that the client station has exited the pre-determined geo-fence zone.

3. The method of claim 1, further comprising:
    performing a binary search to determine the scan time interval based on at least one of the signal strength information or probe response success rate.

4. The method of claim 3, wherein the binary search is performed when the client station is charging.

5. The method of claim 1, further comprising:
    transmitting an inquiry from the client station to the database requesting the subset of channels, wherein the subset of channels is based on the identification of channels stored in the buffer of the database.

6. The method of claim 5, wherein the transmitting of the inquiry occurs when the client station is operating on battery power.

7. The method of claim 5, wherein the subset of channels is determined based on at least one of a latest or most occurring of the channels stored in the buffer.

8. The method of claim 1, wherein the client station is a wearable device used for tracking and monitoring pet activity.

9. The method of claim 1, wherein the determining of the subset of channels and the determining of the scan time interval reduces at least one of battery usage at the client station or execution time for the identifying of the location of the client station.

10. A client station comprising:
    at least one non-volatile storage medium comprising computer program code; and
    at least one processor;
    wherein the computer program code is configured, when executed by the at least one processor, to cause the client station to:
    sense a service set identifier for a wireless access network;
    determine a subset of channels within the wireless access network by accessing information stored in a database;
    determine a scan time interval associated with the service set identifier by accessing the information stored in the database;
    transmit a probe request through the subset of channels to an access point located within the wireless access network;
    receive a probe response from the access point during the scan time interval;
    store the probe response received at the client station in the database, wherein the probe response comprises at least one of signal strength information, success rate, or an identification of the channels from which the probe response was received; and
    identify location of the client station based on the probe response.

11. The client station of claim 10, wherein the computer program code is configured, when executed by the at least one processor, to cause the client station to:
confirm that the client station is located outside a pre-determined geo-fence zone based on the identified location; and
transmit an indication to the user equipment that the client station has exited the pre-determined geo-fence zone.

12. The client station of claim 10, wherein the computer program code is configured, when executed by the at least one processor, to cause the client station to:
perform a binary search to determine the scan time interval based on at least one of the signal strength information or probe response success rate.

13. The client station of claim 12, wherein the binary search is performed when the client station is charging.

14. The client station of claim 10, wherein the computer program code is configured, when executed by the at least one processor, to cause the client station to:
transmit an inquiry from the client station to the database requesting the subset of channels, wherein the subset of channels is based on the identification of channels stored in the buffer of the database.

15. The client station of claim 14, wherein the transmitting of the inquiry occurs when the client station is operating on battery power.

16. The client station of claim 14, wherein the subset of channels is determined based on at least one of a latest or most occurring of the channels stored in the buffer.

17. The client station of claim 10, wherein the client station is a wearable device used for tracking and monitoring pet activity.

\* \* \* \* \*